United States Patent [19]
Muto et al.

[11] Patent Number: 5,847,778
[45] Date of Patent: Dec. 8, 1998

[54] VIDEO DISPLAY DEVICE

[75] Inventors: Yasuaki Muto, Toyonaka; Hiroshi Miyai, Takarazuka; Akio Takimoto, Nayagawa; Yasunori Kuratomi, Sulta; Toshikazu Kawakami, Osaka; Hiroshi Noguchi, Ibaraki, all of Japan

[73] Assignee: Matsushita Electric Industrial Co., Ltd., Osaka, Japan

[21] Appl. No.: 675,185

[22] Filed: Jul. 3, 1996

[30] Foreign Application Priority Data

| Jul. 3, 1995 | [JP] | Japan | 7-167228 |
| Oct. 20, 1995 | [JP] | Japan | 7-272670 |
| Oct. 20, 1995 | [JP] | Japan | 7-272672 |

[51] Int. Cl.$^6$ .............................. H04N 9/12; H04N 9/16
[52] U.S. Cl. .................... 348/759; 348/761; 348/776; 349/25; 349/28; 349/37
[58] Field of Search .................... 348/759, 761, 348/776, 739, 777, 744; 349/25, 28, 37, 172, 27; H04N 9/12, 9/16

[56] References Cited

U.S. PATENT DOCUMENTS

| 5,178,445 | 1/1993 | Moddel et al. | 359/85 |
| 5,694,182 | 12/1997 | Mitsuoka et al. | 349/1 |

*Primary Examiner*—Glenton B. Burgess
*Attorney, Agent, or Firm*—Ratner & Prestia

[57] ABSTRACT

In a projection type video display device comprising a light writing type spacial light modulator, disturbances brought about by a resetting pulse and appearing in a projected picture as a black belt or beat are prevented. This is accomplished by causing the resetting pulse, which is to withdraw electric charges produced by incoming writing light and accumulated in spacial light modulator, to occur within a vertical blanking period synchronized with vertical synchronization signal.

Further, by changing the pulse width and the voltage of the resetting pulse in accordance with vertical synchronization frequency, pictures of a certain fixed brightness are made available against various vertical synchronization frequencies; and even with a high vertical synchronization frequency, projected pictures are never annoyed by such disturbance that is caused by a resetting pulse dislocated out of the vertical blanking period.

Further, by controlling the adjustments of the writing voltage to be applied to the spacial light modulator during the writing period and the resetting voltage to be applied to the spacial light modulator during the resetting period, the spread in characteristics of the spacial light modulator is compensated to provide a certain fixed contrast and γ characteristic. Furthermore, in a video display device for full-color display, writing voltage and resetting voltage can be established independently corresponding to the respective three RGB primary colors, video outputs of any desired color temperature are obtainable by adjusting the balance of light emission among the three RGB colors.

4 Claims, 12 Drawing Sheets

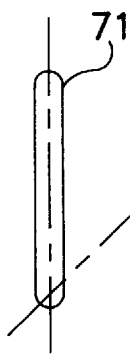 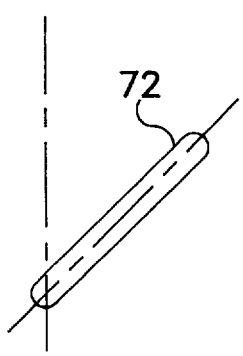 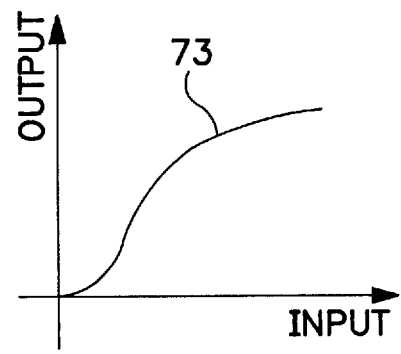
FIG. 9A-1    FIG. 9A-2    FIG. 9A-3
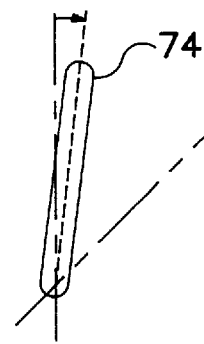 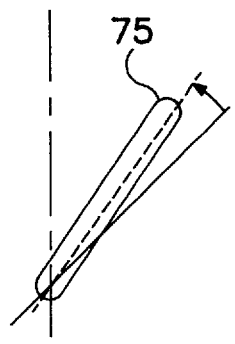 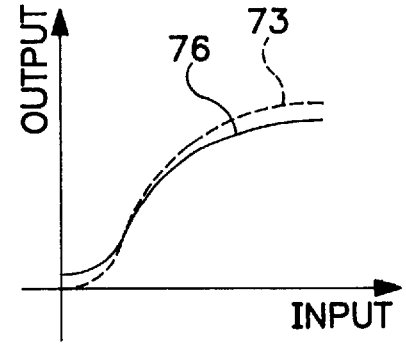
FIG. 9B-1    FIG. 9B-2    FIG. 9B-3
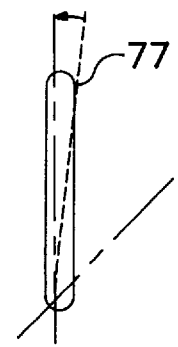 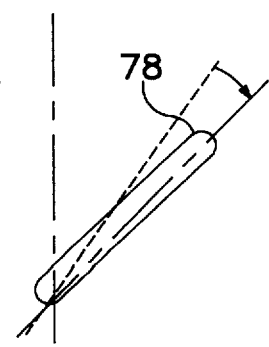 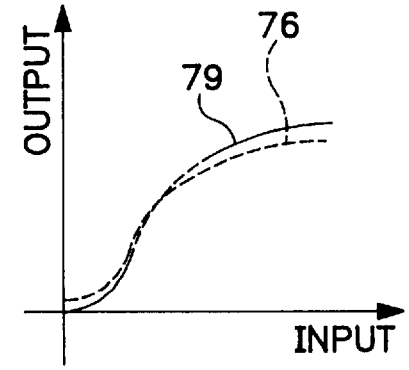
FIG. 9C-1    FIG. 9C-2    FIG. 9C-3

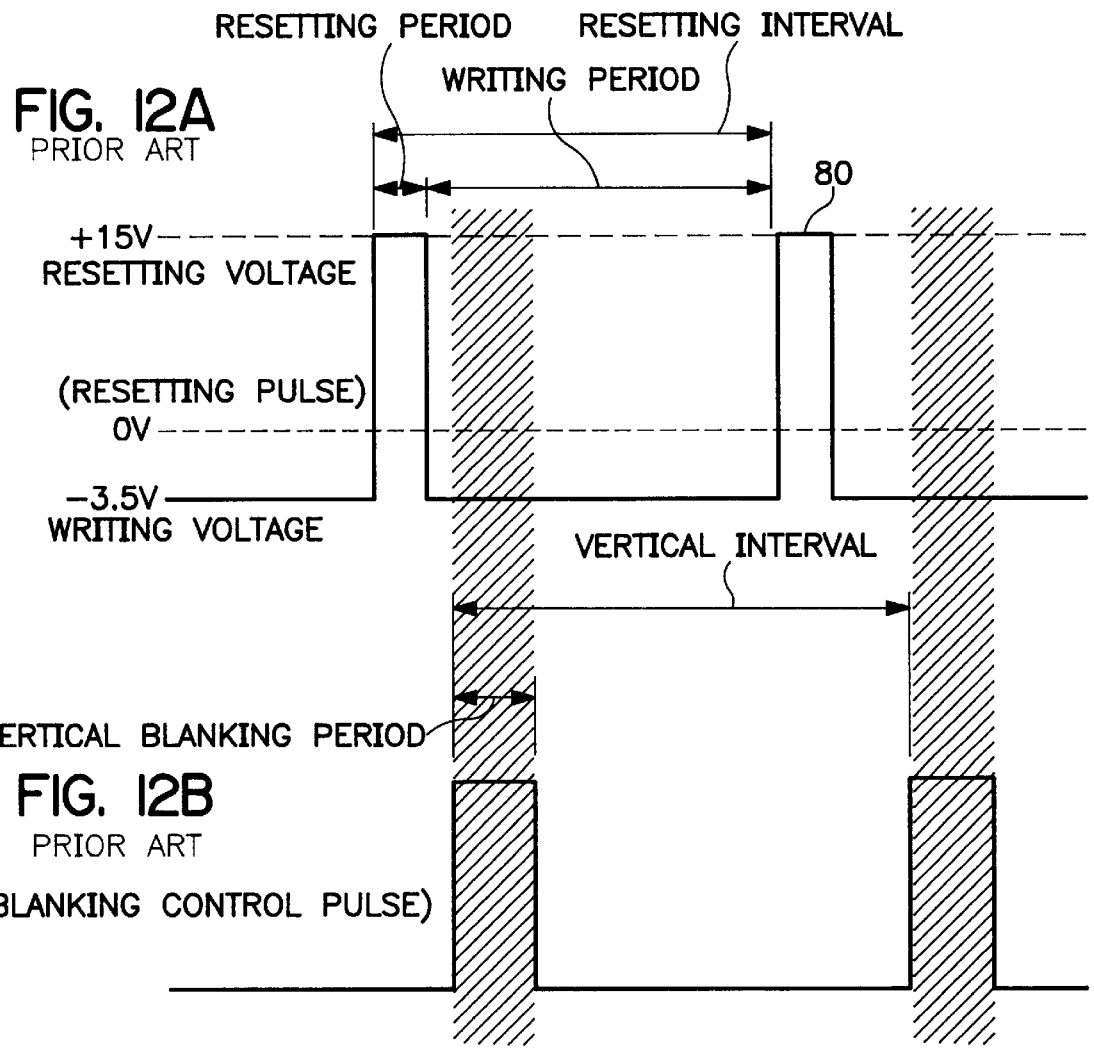

VIDEO DISPLAY DEVICE

BACKGROUND OF THE INVENTION

The present invention relates to a video display device comprising a spacial light modulator.

Video display devices comprising spacial light modulators have been attracting keen attention because of the high brightness of the projected picture as compared with that projected by a transmission type liquid crystal projector. The spacial light modulator is a key device of the video projection system for outputting a readout light, modulated in strength by a writing light, through reflection by an internal reflection layer.

The following, is a description of the structure and the operation of a prior art spacial light modulator. FIG. 10 shows the inside structure of a spacial light modulator 1. In FIG. 10, numeral 101 denotes a glass substrate in writing side; 102 is an electrode made of a transparent electro-conductive layer, such as an indium tin oxide (ITO) electrode, in writing side; 103 is a photodiode having pin construction comprised of amorphous silicon (hereinafter referred to as an a-Si photodiode), made up of three semi-conductor layers in the following order from the side of writing light: a p-type layer 104, an insulation layer (i-layer) 105, and an n-type layer 106; 107 is an aluminum readout light reflection layer; 108 is an insulation layer of carbon in lattice form which splits the aluminum readout light reflection layer into small pieces in a longitudinal and lateral arrangement, breaking the conduction between the small pieces of light reflection layer located next to each other. Numeral 109 denotes a liquid crystal layer of ferroelectric material for controlling the tone of the picture, 110 is an ITO electrode in the readout light side, 111 is a glass substrate in the readout light side, 20 is a writing light, 22 is an incoming readout light, 23 is a reflected readout light, 2 is a reset pulse generating circuit for generating a reset pulse to be applied between the two ITO electrodes, 102 and 110, in order to drive the spacial light modulator.

The following is a description of the operation of a video display device comprising a spacial light modulator. When no voltage is applied to the liquid crystal layer 109, the reflected readout light 23 reflected by the aluminum readout light reflection layer 107 is outputted maintaining the same state of polarization as inputted from the glass substrate 111. When a voltage is applied to the liquid crystal layer 109 and the voltage is gradually increased, the polarization state of reflected readout light 23 reflected by the readout light reflection layer 107 gradually changes, and when the applied voltage exceeds a certain value the reflected readout light 23 is outputted with a completely opposite polarization.

The operation of a spacial light modulator 1 having an internal structure as shown in FIG. 10 is divided into two periods; a writing period for accumulating electrical charges in accordance with the strength of writing light 20, and a resetting period for removing the accumulated electrical charges.

In a case where the ITO electrode 110 on the side of the incoming readout light 22 is grounded as shown in FIG. 10, a negative voltage is applied to the ITO electrode 102 on the side of the writing light. Namely, the a-Si photodiode 103 is reverse biased. During a writing period when there is no writing light 20, almost all of the voltage applied to the two ITO electrodes, 102 and 110, is applied to the a-Si photodiode 103, with almost no voltage on liquid crystal layer 109. Under such state, the readout light 22 incoming to the spacial light modulator 1 is reflected as is, without a shift in the state of polarization, and outputted as reflected readout light 23. When there is writing light 20, electrons at the border between the p-type layer 104 and the insulation layer 105 of a-Si photodiode 103, are excited by the writing light 20. These electrons are pulled by positive potential and move towards the liquid crystal layer 109. As the result, in the vicinity of respective surfaces of liquid crystal layer 109, electric charges of reverse polarity accumulate, resulting in an applied voltage to the liquid crystal layer 109. With increase intensity of writing light 20, the voltage on the liquid crystal layer 109 increases. The state of polarization of the readout light is varied by the voltage on liquid crystal layer 109, and the state of polarization of reflected readout light 23 is shifted accordingly and outputted.

During the resetting period, a positive voltage, with respect to ITO electrode 110, is applied to ITO electrode 102. Namely, the a-Si photodiode 103 is forward biased and the electric charges accumulated during the writing period are withdrawn all at once. This way, when the voltage applied to the ITO electrodes 110 and 102 is opposite in polarity to that of writing period, the electric charges accumulated in reflection layer 107 are removed, resulting in no voltage on the liquid crystal layer 109. As the result, during the resetting period a situation is restored where the reflected readout light 23 is maintained in the same state of polarization as the incoming readout light 22.

Each of the small pieces of the aluminum light reflection layer 107, split by the lattice form insulation layer 108, makes an individual pixel. The lattice form carbon insulation layer 108 electrically insulates so electric charges stored in one of the small pieces of aluminum reflection layer 107 during the writing period do not move to a neighboring small piece.

FIG. 11 is an illustration of a conventional video display device comprising the above described spacial light modulator 1. In FIG. 11, numeral 1 denotes a spacial light modulator, 2 is a reset pulse generating circuit for supplying a reset pulse to the spacial light modulator 1, 3 is a writing video light generating apparatus in which a CRT is normally used and comprised of a CRT 9 and a CRT driving circuit 10. Numeral 4 denotes a writing lens for focusing an image outputted from CRT 9 on the writing light incoming surface of the spacial light modulator 1; 5 is a beam splitter for reflecting or transmitting the light depending on the difference in the state of polarization, which reflects the S wave and transmits the P wave; 6 is a light source of the incoming readout light 22, which is normally a xenon lamp or a metal halide lamp; and 7 is a projection lens for focusing the reflected readout light 23 on a screen 8 as a picture.

The following describes the operation of a video display device constituted as shown in FIG. 11. A video signal generated in the writing video light generating apparatus 3 is outputted from CRT 9 as a writing light 20 to be irradiated on the writing side of spacial light modulator 1 through writing lens 4. Writing light 20 irradiated on spacial light modulator 1 makes each of the pixels accumulate electric charges corresponding to the intensity distribution of the light irradiated on the incoming surface.

A light of random polarity 21 is generated from light source 6. As beam splitter 5 reflects the S wave and transmits the P wave, only the S wave reflected by beam splitter 5 is supplied to spacial light modulator 1 as incoming readout light 22. The incoming readout light 22 supplied to the spacial light modulator 1 is reflected within the spacial light modulator 1 to become reflected readout light 23, during which procedure the state of polarization of the reflected readout light 23 is varied by the electric charges stored in the spacial light modulator 1. The stronger the writing light 20 supplied to the spacial light modulator 1, the higher the voltage applied to the liquid crystal layer 109, resulting in the reflected readout light 23 changing state from the S wave to P wave. The resulting voltage applied to the liquid crystal layer 109 is negative on the writing side with respect to the reading side. As beam splitter 5 allows only the P wave to pass through, the element of P wave alone contained in reflected readout light 23 goes through beam splitter 5 to be focused on screen 8 by projection lens 7.

The state of polarization of reflected readout light 23 varies depending on the quantity of electric charges accumulated in the spacial light modulator 1; when the intensity of writing light 20 is high, an image projected on screen 8 is bright, while it is dark when the intensity is low. Since the image information supplied to the spacial light modulator 1 by the writing light 20 is different in each of the respective pixels, the respective pixels have different electric charges; therefore the state of polarization of reflected readout light 23 varies in each of the respective pixels and an image is projected on screen 8 in accordance with the image information supplied.

The following is a description of the resetting pulse. In FIG. 12(a), a typical resetting pulse 80 is shown. The voltages indicated in FIG. 12(a) are applied between ITO electrode 102 on the writing light side and the ITO electrode 110 on the readout side. A voltage of −3.5V is applied during the writing period and a voltage of +15V is applied during the resetting period. The wave form is rectangular, and the resetting period duration is 300 μs, the duration being unrelated to the vertical synchronization frequency. The form of resetting pulse has three parameters; they are, the width of the resetting pulse, the resetting voltage (a voltage to be applied during resetting period between two ITO electrodes, 102 and 110, of spacial light modulator 1) and the writing voltage (a voltage to be applied during writing period between two ITO electrodes, 102 and 110, of spacial light modulator 1). When the resetting pulse width increases, a picture projected on the screen gets darker, and the higher resetting voltage results in the lower brightness of the picture. Meanwhile, the higher the absolute value of writing voltage the brighter the picture.

Video display devices comprising the above described spacial light modulator 1 are attracting an interest because of a significantly brighter picture over that by transmission type liquid crystal projectors. However, conventional video display devices comprising spacial light modulators, have several problems as described below.

In conventional video display devices comprising spacial image modulators, the resetting period does not coincide with the vertical blanking period,., Accordingly the resetting pulse shown in FIG. 12(a) does not basically overlap with the vertical blanking period, as shown in FIG. 12(b). Resettings are repeated while a picture is being projected. Therefore, in a case where the resetting cycle is relatively closer to the vertical blanking cycle the projected picture has a disturbance by a black belt. In a case where the resetting cycle is shorter than the vertical blanking cycle, the picture suffers from a beat disturbance. Further, because a projected picture gets dark during the resetting period, it was impossible to maximize the time aperture ratio, which resulted in a reduced brightness of the projected picture. This is the first problem.

The above described time aperture ratio is defined by the integration of the light intensity values; where a state in which the highest intensity light is constantly maintained is equal to 100% time aperture ratio. In observing a practical video signal in terms of the brightness from a point in an observation space, even if the brightness is significantly varied within a small fraction of time, the brightness visually perceivable is an integration of the brightness values during the fraction of time, because the speed of compliance by the human eyes is about 1/60 sec. In conclusion, the time aperture ratio is a unit to represent relative brightness; and the higher the value the brighter the picture.

When various images having different vertical synchronization frequencies are to be projected, a balanced timing between resetting and writing is ruined by the vertical synchronization signals, because the resetting period is fixed. When the resetting period goes long, a picture projected on screen gets dark. A second problem stems from the vertical synchronization frequency: because the brightness of a picture on the screen is determined by the relative time ratio between the resetting period and the writing period, if the vertical synchronization frequency is high, the time ratio of the resetting period goes relatively high, resulting in a reduced time aperture ratio, consequently a darker picture.

Further, among various systems comprising spacial light modulators, it is normal to have system to system spreads in the light output. This is mainly caused first by spread in the voltage to be applied to liquid crystal layer 109 of the spacial light modulator 1. This is because there is a spread in the quantity of electrons to be produced by the writing light in an a-Si photodiode layer 103 of a spacial light modulator, and because the resistance value itself of each of the constituent parts of a spacial light modulator 1 has a spread. A second factor of the spread in the light output lies in a fact that even if a same voltage is applied to the liquid crystal layer 109 of the spacial light modulator 1, different light outputs are produced from each respective spacial light modulator 1 because the aligning directions of liquid crystals subtly differ among respective spacial light modulators 1.

In order to absorb the spreads in light output among respective spacial light modulators 1, conventional video display devices comprise an adjusting means within the writing video light generating apparatus 3 for adjusting intensity of the light for writing video information on the spacial light modulator 1. In a case where the writing video light generating apparatus 3 is comprised of CRT 9 and CRT driving circuit 10, the voltage to be applied to the cathode electrode or grid electrode of the CRT 9 is adjusted in the CRT driving circuit 10. Especially when displaying a color image using three pieces of spacial light modulator 1, this adjustment of light output is essential to solve the spreads in light output of the R, G and B colors; otherwise color temperature of the white is affected.

In conventional video display devices comprising spacial light modulators, the above described method of compensating the spreads in light output of the spacial light modulator 1 through the CRT driving circuit 10 created another cause of inconvenience. Because of spreads in the characteristics of the spacial light modulator 1 and peripheral constituent members, the aligning axis of the liquid crystal is sometimes displaced, or insufficient voltage is applied to the liquid crystal layer 109, which results in a situation where the liquid crystal is not completely aligned for the intentional display of total black, allowing some of the light to reach the screen. Where there is a displacement in the revolution angle of the liquid crystal itself, it may not be possible to completely compensate through the adjustment of the intensity of the writing light alone. For the same reason, where there is a shift in the γ curve of the liquid crystal itself, it may not be possible to completely compensate through the adjustment of the intensity of the writing light alone. If unable to display the total black and the total white, the contrast of the projected picture is affected and the quality of picture deteriorates. These inconveniences that have arisen as a result of the adjustment of the light intensity for compensating the spread in light output are of a nature which is not solvable through the adjustment of the intensity of light for writing on spacial light modulator 1.

As described above, conventional video display devices comprising spacial light modulators have a third problem that stems from the spread in characteristics of the spacial light modulator itself.

SUMMARY OF THE INVENTION

Various problems as described above are solved by the present invention. The degradation of picture quality due to disturbances like a dark belt and beat hazard in the picture, occurring as a result of the application of the resetting pulse, are removed. The decreased brightness that stems from the vertical synchronization frequency is solved, and the decreased contrast due to the inability to display complete black or complete white is improved. Thus the present invention intends to prevent deterioration of the quality of picture displayed.

A video display device, according to a first embodiment of the present invention, comprises a light writing type spacial light modulator, a writing video light generating apparatus for generating a light scanning horizontally and vertically for writing in said spacial light modulator, and a vertical synchronization reset pulse generating circuit for generating a reset pulse synchronized with a vertical synchronization signal of said writing video light generating apparatus for withdrawing electric charges produced by the incoming writing light and accumulated in said spacial light modulator, to be applied between the first and second electrodes of said spacial light modulator.

The reset pulse generator of a video display device, according to the first embodiment, generates a resetting pulse only once for each vertical blanking period.

A video display device, according to a second embodiment of the present invention, comprises a light writing type spacial light modulator, a writing video light generating apparatus for generating a light scanning horizontally and vertically for writing in said spacial light modulator, a vertical synchronization reset pulse generating circuit for generating a reset pulse synchronized with a vertical synchronization signal of said writing video light generating apparatus for withdrawing electric charges produced by the incoming of said writing light and accumulated in said spacial light modulator, to be applied between the first and second electrodes of said spacial light modulator, a frequency/voltage converting circuit for converting the frequency of said vertical synchronization signal to a voltage in accordance with the frequency value, and a reset pulse controlling circuit for modulating the pulse width of said resetting pulse, the resetting voltage to be applied between the two electrodes of said spacial light modulator during the resetting period and the writing voltage to be applied between the two electrodes of said spacial light modulator during a writing period in accordance with the output of said frequency/voltage converting circuit.

A video display device, according to a third embodiment of the present invention, comprises a light writing type spacial light modulator, a writing video light generating apparatus for generating a light scanning horizontally and vertically for writing in said spacial light modulator, a reset pulse generating circuit for generating a reset pulse for withdrawing electric charges produced by the incoming of said writing light and accumulated in said spacial light modulator, to be applied between the first and second electrodes of said spacial light modulator, and a reset pulse voltage adjusting circuit for varying the writing voltage to be applied between the two electrodes of the spacial light modulator during the writing period and the reset voltage to be applied between the two electrodes of the spacial light modulator during a resetting period.

The reset pulse voltage adjusting circuit of the third embodiment of the present invention comprises a voltage generator for generating the writing voltage to be applied between the two electrodes of the spacial light modulator during the writing period and the reset voltage to be applied between the two electrodes of the spacial light modulator during the resetting period, a voltage controller for controlling the voltage to be outputted from said voltage generator, and a memory circuit for memorizing said voltage value.

In the first embodiment, resetting is performed within the vertical blanking period. Consequently, picture disturbances like black belt or beat hazard that appeared in a prior art devices when a resetting pulse was applied to a spacial light modulator, do not come in sight; and the time aperture ratio can be maximized.

In the second embodiment, time balance between the resetting and the writing can be adjusted for a varied vertical synchronization frequency, by varying the reset pulse voltage and the reset pulse width in accordance with the vertical synchronization frequency. Therefore, the brightness of the picture is maintained constant without degrading the time aperture ratio.

In the third embodiment, voltage to be applied to the liquid crystal layer of the spacial light modulator can be adjusted for the varying light output of the spacial light modulator by adjusting the resetting voltage and the writing voltage to be applied between the two electrodes of the spacial light modulator. The resetting voltage and the writing voltage are adjusted by the reset pulse controlling circuit, comprised in the embodiment, which varies the writing voltage to be applied between the two electrodes of the spacial light modulator during the writing period and the resetting voltage to be applied between the two electrodes of the spacial light modulator during the resetting period. Consequently, the displacements in aligning axis and γ characteristics of the liquid crystal of the spacial light modulator, compensation of which was impossible by adjustment of the light intensity of the writing light to the spacial light modulator, are compensated and display of the complete black and the complete white becomes possible.

The reset pulse controlling circuit of the third embodiment allows easy adjustment of the writing voltage to be applied to the two electrodes of the spacial light modulator during the writing period and the resetting voltage to be applied to the two electrodes of the spacial light modulator during the resetting period.

BRIEF DESCRIPTION OF THE DRAWINGS

FIGS. 2A and 2B are waveform charts showing the relationship between the resetting pulse and the vertical blanking.

FIGS. 9A-1, 9A-2, 9A-3, 9B-1, 9B-2, 9B-3, 9C-1, 9C-2 and 9C-3 are all diagrams which are useful for explaining the voltage adjustment of the spacial light modulator.

FIGS. 12A and 12B are waveform charts showing the conventional relationship between the resetting pulse and the vertical blanking.

DESCRIPTION OF THE PREFERRED EMBODIMENT (First Embodiment)

Figure 1:
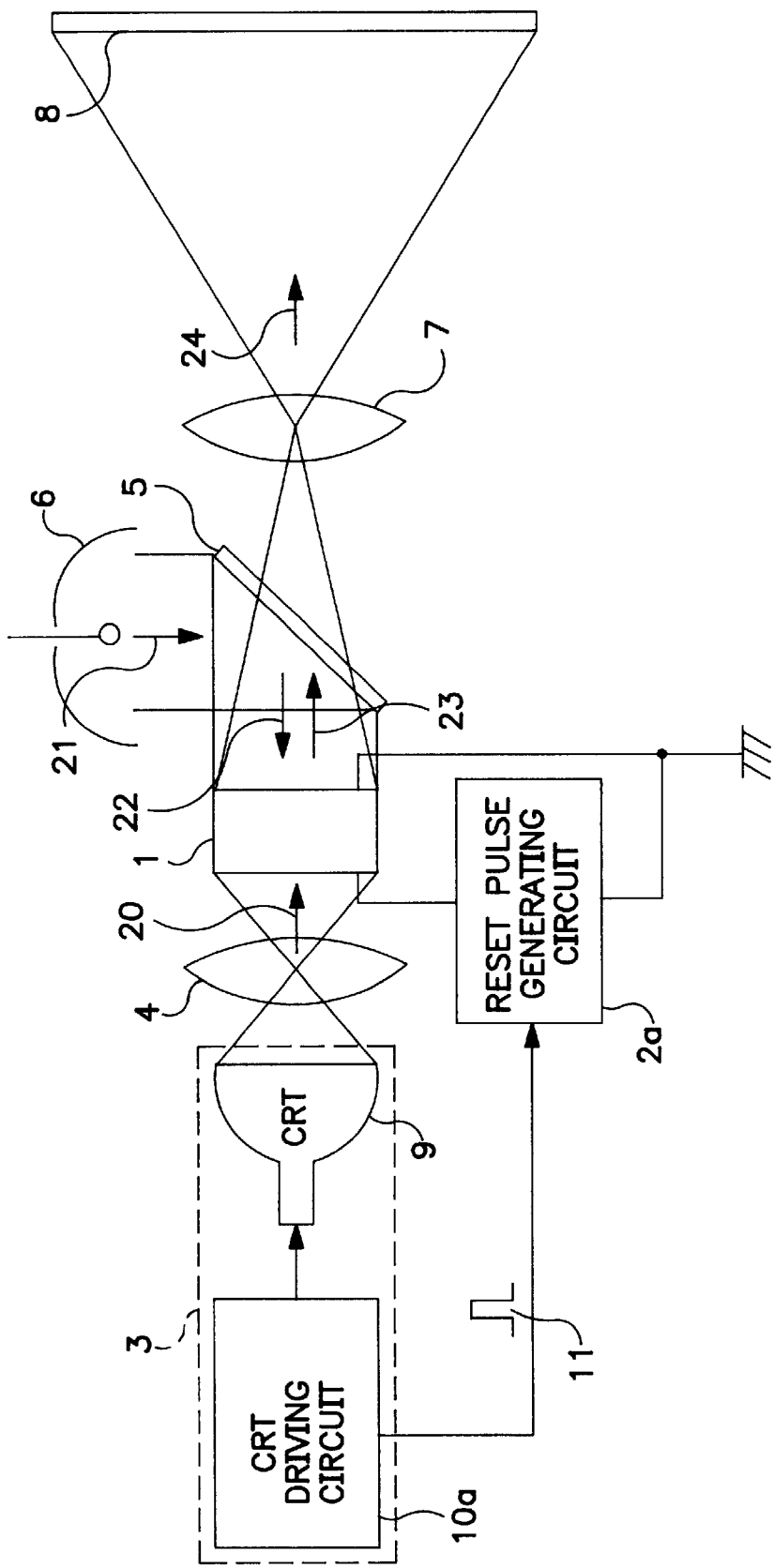
FIG. 1 is a diagram illustrating a video display device according to the first embodiment of the present invention.

FIG. 1 shows a video display device according to the first embodiment of the present invention. In FIG. 1 numeral 1 denotes a spacial light modulator, 2a a reset pulse generating circuit, 3 a writing video light generating apparatus comprised of, in this embodiment, a CRT 9 and a CRT driving circuit 10a. Numeral 4 denotes a writing lens for having a video light outputted from the writing video light generating apparatus 3 focused on the spacial light modulator 1, 5 a beam splitter for reflecting or transmitting a light depending on the state of polarization, reflecting the S wave and transmitting the P wave. Numeral 6 denotes a light source of readout light, e.g. a xenon lamp. Numeral 7 denotes a projection lens which projects an image on a screen 8. The constitution and functioning of spacial light modulator 1 have already been described above, therefore such explanation is omitted here.

Figure 11:
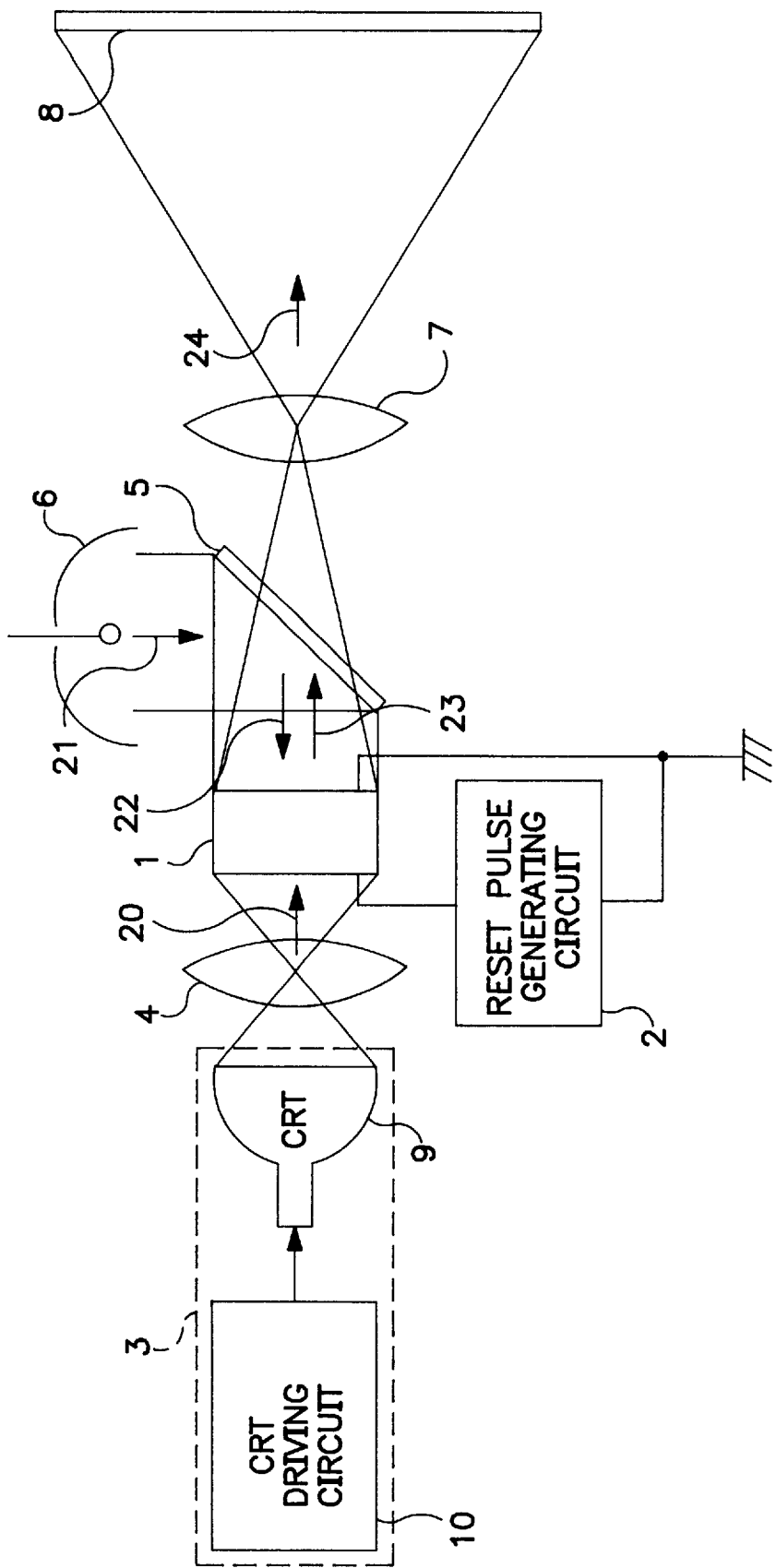
FIG. 11 is a diagram illustrating a prior art video display device.

Although operation of the basic part of the video display device shown in FIG. 1 remains the same as that of a prior art video display device shown in FIG. 11, a description is repeated here for ease of comprehension. In FIG. 1, a video signal generated in the writing video signal generating apparatus 3 is outputted from CRT 9 as a writing light 20 to be irradiated on the incoming side of spacial light modulator 1 through the writing lens 4. The writing light 20, irradiated on the spacial light modulator 1, makes each of the pixels accumulate electric charges corresponding to the intensity distribution of the light irradiated on the incoming surface.

A light of random polarity 21 is generated from the light source 6. As the beam splitter 5 reflects the S wave and transmits the P wave, only the S wave reflected by the beam splitter 5 is supplied to the spacial light modulator 1 as incoming readout light 22. The incoming readout light 22 supplied to the spacial light modulator 1 is reflected within the spacial light modulator 1 to become reflected readout light 23, a procedure during which the state of polarization of reflected readout light 23 is varied by the electric charges stored in the spacial light modulator 1. When a writing light 20 is supplied on spacial light modulator 1, the reflected readout light 23 changes its state from the S wave to P wave. As beam splitter 5 allows only the P wave to pass through, elements of P wave alone contained in the reflected readout light 23 go through the beam splitter 5 to be focused on the screen 8 by the projection lens 7.

The state of polarization of reflected readout light 23 varies depending on the quantity of electric charge accumulated in the spacial light modulator 1; when the intensity of the writing light 20 is high a picture projected on the screen 8 is bright, while it is dark when the intensity is low. Image information supplied on the spacial light modulator 1 differs in each of the respective pixels, and each of the pixels is provided with different electric charges of its own; therefore the state of polarization of the reflected readout light 23 varies depending on respective pixels and a picture is projected on the screen 8 in accordance with the image information supplied.

The electric charges accumulated during a writing period within the spacial light modulator 1 by the writing light 20 are withdrawn by applying a resetting pulse between two ITO electrodes of the spacial light modulator 1. In this first embodiment, a synchronization signal 11 outputted from the CRT driving circuit 10a of the writing video light generating apparatus 3 is outputted to the reset pulse generating circuit 2a. As a result, the resetting pulse is synchronized with the vertical synchronization signal 11, and applied between the two ITO electrodes of the spacial light modulator 1. As the resetting pulse is arranged to occur only once during the vertical blanking period of the writing video light generating apparatus 3, the black belt which appeared in a conventional picture due to the resetting pulse comes up during the vertical blanking period in this embodiment; so it does not appear in a picture.

FIG. 2(a) shows a typical voltage waveform of a reset pulse 30 according to this embodiment. The voltage of the reset pulse 30 in FIG. 2(a) is indicated with readout side ITO electrode 110 of spacial light modulator 1 shown in FIG. 10 as the base potential. The voltage is a square wave of −3.5V during the writing period, and +15V during the resetting period. Duration of the resetting period is 300 μsec., and the reset pulse occurs within the vertical blanking period as described earlier. FIG. 2(b) shows the timing of control on vertical blanking, indicating that the resetting period in FIG. 2(a) is included within the vertical blanking period of FIG. 2(b).

According to the first embodiment of the present invention, the black belt, which conventionally appeared due to the reset pulse in a picture, occurs within a vertical blanking period, therefore never appears in a picture. Further, the time aperture ratio can be set to the highest possible extent. Thus a quality picture of high brightness is made available.

Figure 3:
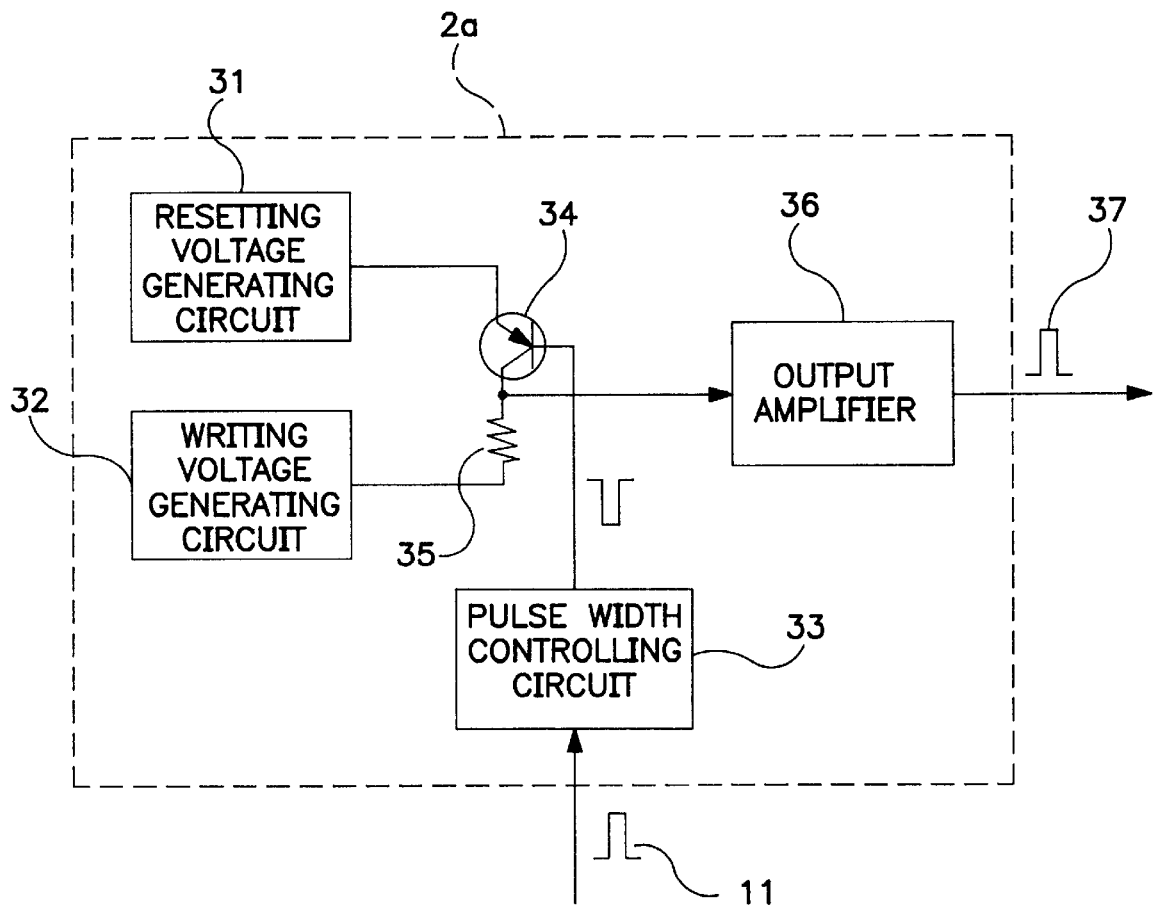
FIG. 3 shows a practical example of a reset pulse generating circuit.

A practical example of a reset pulse generating circuit 2a is shown in FIG. 3. A resetting voltage generating circuit 31 generates a resetting voltage to be applied between the two electrodes of the spacial light modulator 1 during the resetting period. A writing voltage generating circuit 32 generates a writing voltage to be applied between the two electrodes of the spacial light modulator 1 during the writing period. In the resetting voltage generating circuit 31 and writing voltage generating circuit 32 of the present embodiment, any desired voltages are produced through a simple voltage dividing circuit comprised of resistors. A pulse width controlling circuit 33 detects the rising of vertical synchronization signal 11, and converts it into a negative polarity pulse having specific pulse width. The pulse width controlling circuit 33 of the present embodiment comprises a general-use mono-stable multi vibrator IC. Numeral 34 denotes an emitter-grounded transistor for reversal, 35 is a collector resistor of transistor 34. A pulse of negative polarity outputted from the pulse width controlling circuit 33 is applied to the base of transistor 34. As a result, a positive polarity pulse is generated in the collector of transistor 34 with the resetting voltage at the HIGH side and writing voltage at the LOW side. The positive polarity pulse is inputted to an output amplifier 36, current of which is amplified to be applied between the two electrodes of the spacial light modulator 1 as reset pulse 37. Since the reset pulse generating circuit 2a is triggered by the vertical synchronization signal 11, a resetting pulse having a desired pulse width is obtainable in synchronization with the vertical synchronization signal 11.

The foregoing descriptions have been made assuming a single color light. For displaying a picture in color using the present system, three sets of spacial light modulator 1, writing video light generating apparatus 3, writing lens 4, beam splitter 5 and projection lens 7 are necessary, each corresponding to the three primary colors, R, G and B, respectively. In addition, a dichroic mirror is needed to split light from light source 6 into the three primary colors, R, G and B. The functions as revealed in the present embodiment also produce the same effects in a color display system.

(Second embodiment)

Figure 4:
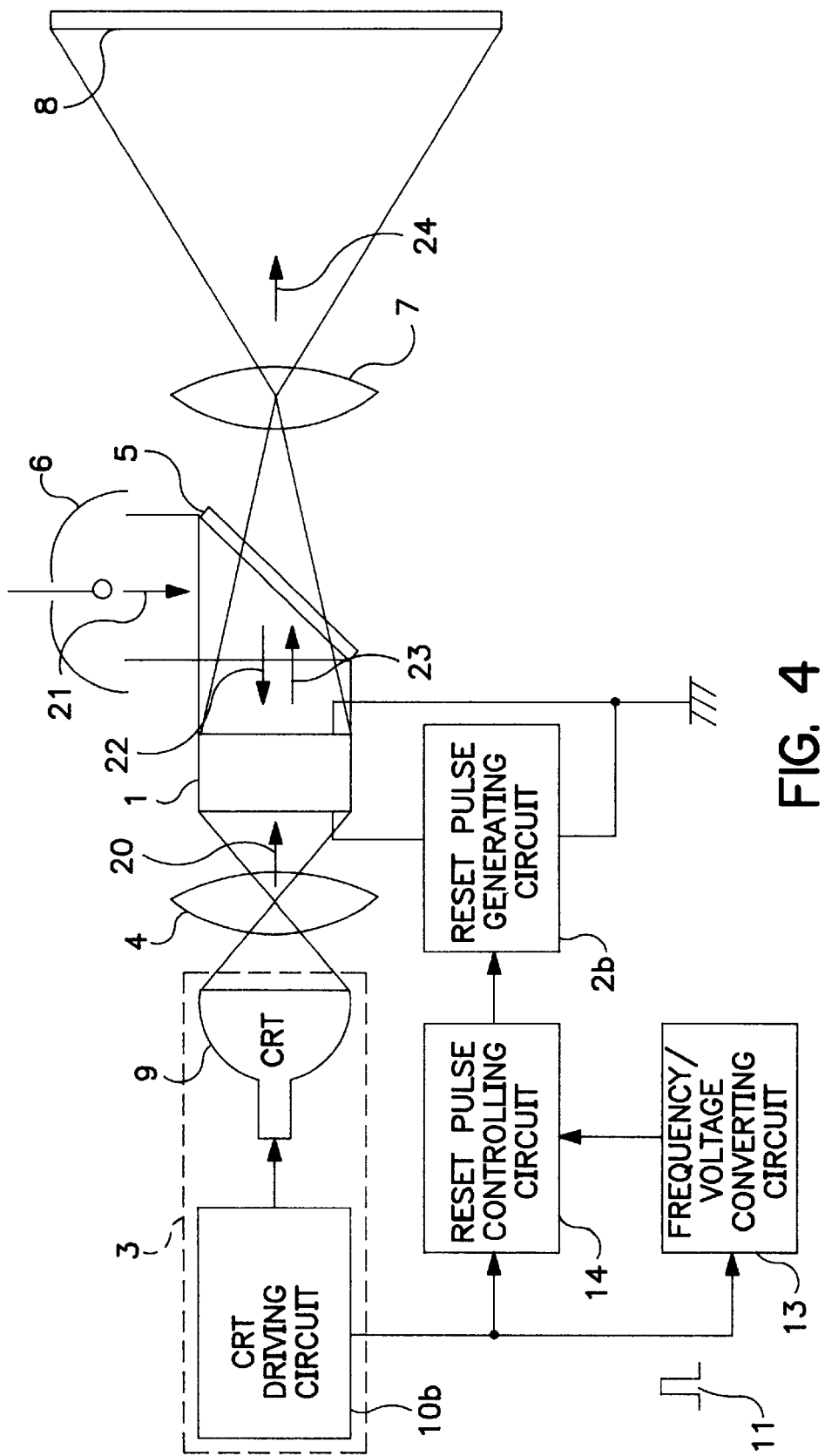
FIG. 4 is a diagram illustrating a video display device according to the second embodiment of the present invention.

FIG. 4 shows the structure of a video display device according to the second embodiment of the present invention. In FIG. 4, numeral 1 denotes a spacial light modulator, 2b a reset pulse generating circuit for driving the spacial light modulator 1, 3 a writing video light generating apparatus which is comprised of a CRT 9 and a CRT driving circuit 10b in this embodiment. Numeral 4 denotes a writing lens for focusing an image outputted from the writing video light generating apparatus 3 on the spacial light modulator 1. Numeral 5 denotes a beam splitter for reflecting or transmitting a light depending on the state of polarization, it reflects the S wave and transmits the P wave. Numeral 6 denotes a readout light source, e.g., a xenon lamp. A projection lens 7 projects a focused image on a screen 8. In the second embodiment, the above described constituent sections operate in the same manner as those of the first embodiment, and the structure and function of spacial light modulator 1 have already been described, therefore these are not repeated here.

In the following, description is made only on the points which differ from the first embodiment. In FIG. 4 numeral 13 denotes a frequency/voltage converting circuit (hereinafter, FV converting circuit), 14 denotes a reset pulse controlling circuit for controlling the form of the reset pulse with the vertical synchronization signal as trigger. The reset pulse controlling circuit 14 in the present embodiment maintains a fixed ratio between the resetting period and the writing period regardless of the frequency of the vertical synchronization signal.

Figure 5:
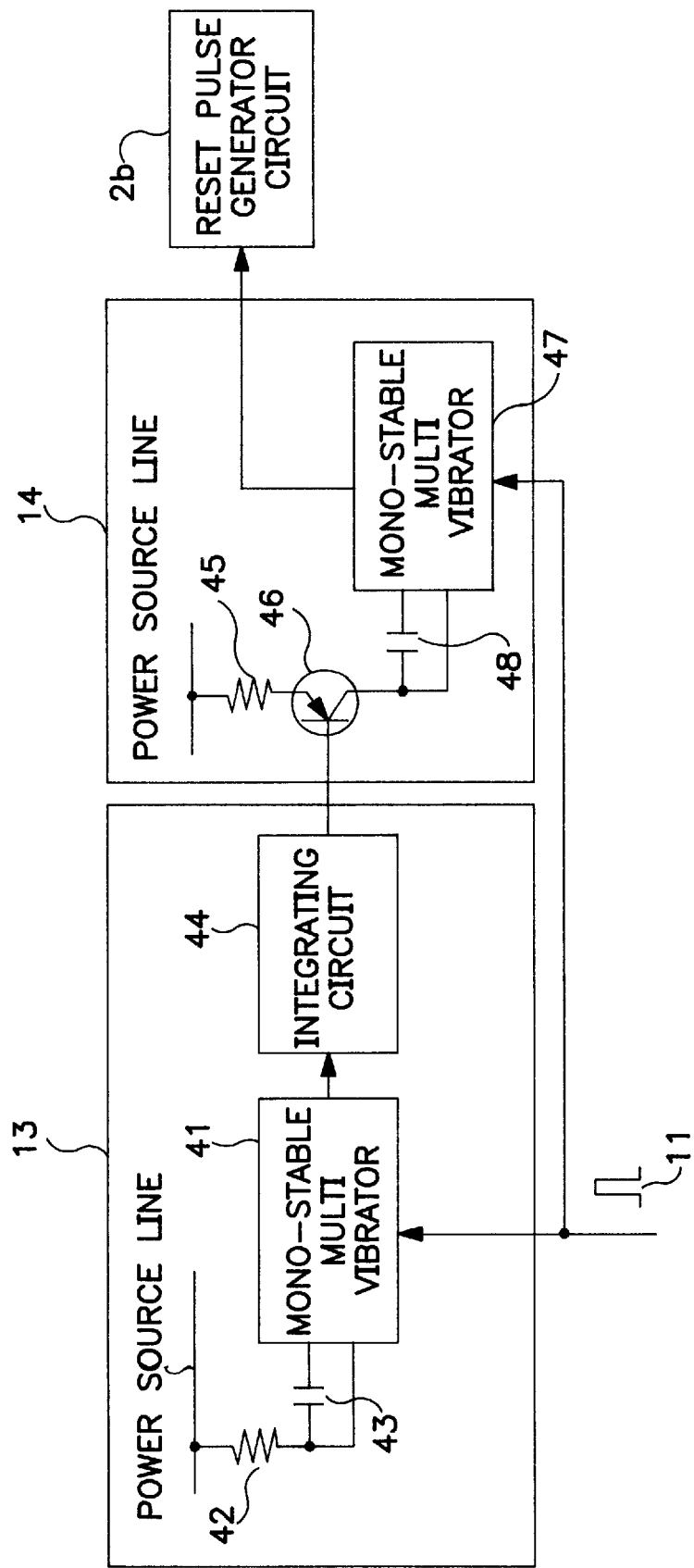
FIG. 5 shows a practical example of a frequency/voltage converting circuit and a reset pulse controlling circuit.

FIG. 5 shows a practical example of the FV converting circuit 13 and the reset pulse controlling circuit 14. When the vertical synchronization signal 11 is inputted, the FV converting circuit 13 generates a voltage corresponding to the frequency of the vertical synchronization signal 11. In a circuit of the present embodiment, the output voltage from the FV converting circuit 13 decreases with an increasing vertical synchronous signal 11 frequency. Practically, in the FV converting circuit 13, the vertical synchronization signal 11 is inputted to a mono-stable multi vibrator 41. The mono-stable multi vibrator 41 generates a negative polarity pulse of a certain width determined by the values of resistor 42 and capacitor 43. The negative polarity pulse is then supplied to an integrating circuit 44 to be integrated there and converted into a direct current voltage. As the input to the integrating circuit 44 is a pulse of negative polarity, the output of the FV converting circuit 13 decreases with an increasing frequency of the vertical synchronization signal 11.

In the reset pulse controlling circuit 14, a pulse is generated by a mono-stable multi vibrator 47. The output voltage of the FV converting circuit 13 is supplied to the base of a transistor 46, and causes the flow of electric current through the emitter resistor 45. As described earlier, when the frequency of the vertical synchronization signal 11 increases, the output voltage of the FV converting circuit 13 decreases, resulting in an increase of electric current flow through the emitter resistor 45, and the capacitor 48 is charged within a short period of time. As a result, the pulse width of the output pulse from the mono-stable multi vibrator 47 decreases. On the contrary, when the frequency of the vertical synchronization signal 11 decreases, the pulse width of the output pulse from the mono-stable multi vibrator 47 increases. Therefore, by setting the constant of the emitter resistor 45 and the capacitor 48 at an appropriate value, the time ratio of the output pulse of the mono-stable multi vibrator 47 to the vertical interval may be fixed. As the output pulse of the mono-stable multi vibrator 47 is triggered by the vertical synchronization pulse 11, an output pulse having a fixed pulse width time ratio, and synchronized with the vertical synchronization frequency, is supplied to the reset pulse generating circuit 2b.

As described above, by controlling the reset pulse width in accordance with the frequency of the vertical synchronous signal, it becomes possible to solve the problems stemming from the vertical synchronization frequency. The time balance of resetting and writing is broken by the vertical synchronization signal, and as the vertical synchronization frequency increases, the time aperture ratio decreases, rendering a dark picture.

In the second embodiment described above, the reset pulse width has been controlled in accordance with the vertical synchronization frequency. When the reset pulse width is increased, a picture projected on screen 8 gets dark. In addition to the width of the reset pulse, parameters for shaping of the resetting pulse include the reset voltage to apply between the two electrodes of the spacial light modulator 1 during the resetting period and the writing voltage to be applied between the two electrodes of the spacial light modulator 1 during the writing period. There exists a relationship that a higher reset voltage results in a darker image output, and the higher the absolute value of the writing voltage the brighter the image output. Consequently, shifting of any of said three parameters results in the same effect of controlling the brightness of a picture.

For example, when the vertical synchronization frequency increases, the balance between the resetting and the writing is broken and image output darkens. This can be compensated by decreasing the resetting voltage. However, in a case where the reset pulse width is kept fixed, if the vertical frequency increases the resetting pulse can not be provided within the vertical blanking period. This results in an overlapping of the resetting pulse and the image signal which is projected dark on a screen. In order to avoid occurrence of such deterioration of picture quality, the reset pulse controlling circuit 14 in the second embodiment of the present invention controls the width of the reset pulse in accordance with the vertical synchronization frequency.

In the reset pulse controlling circuit, it is easy to modulate the reset voltage and the writing voltage, which are applied between the two electrodes of the spacial light modulator 1 during the resetting period and writing period respectively, by the output of FV converting circuit 13. Practically, when vertical synchronization frequency increases, the output voltage from the FV converting circuit 13 decreases. Therefore, by modulating the reset voltage with the output voltage from the FV converting circuit 13 using an operational amplifier or other means, the reset voltage may be decreased when the vertical synchronization frequency increases, and a picture projected on screen can be maintained as brighter as compared with that without modulating the reset voltage. Also, the phenomenon where a projected picture turns dark when the vertical frequency increases can be compensated. Similarly, by modulating the writing voltage with the output voltage from FV converting circuit 13, the writing voltage may be decreased (the absolute value increases) when the vertical synchronization frequency increases, and the brightness of the projected picture can be maintained at a constant level.

As described above, by modulating the reset voltage and the writing voltage, not only the reset pulse width, with the vertical synchronization frequency the brightness of video output can be maintained constant against varied vertical synchronous frequency when projecting various pictures of different vertical synchronization frequencies. In addition, the reset pulse can be disposed within the vertical blanking period even when the vertical frequency is high; thus, the reset pulse and the video signal never supersede each other, so the degradation of picture quality caused by an overlapping of the reset pulse and the video signal projected on a screen as a black belt is prevented.

The foregoing descriptions have been made assuming a single color light. For displaying a picture in full-color using the present system, three sets of spacial light modulator 1, writing video light generating apparatus 3, writing lens 4, beam splitter 5 and projection lens 7 are necessary, each corresponding to the three primary colors, R, G and B, respectively. In addition, a dichroic mirror is needed to split light from a light source 6 into the three primary colors, R, G and B. The functions as revealed in the present embodiment also produce the same effects in a full-color display system.

(Third Embodiment)

Figure 6:
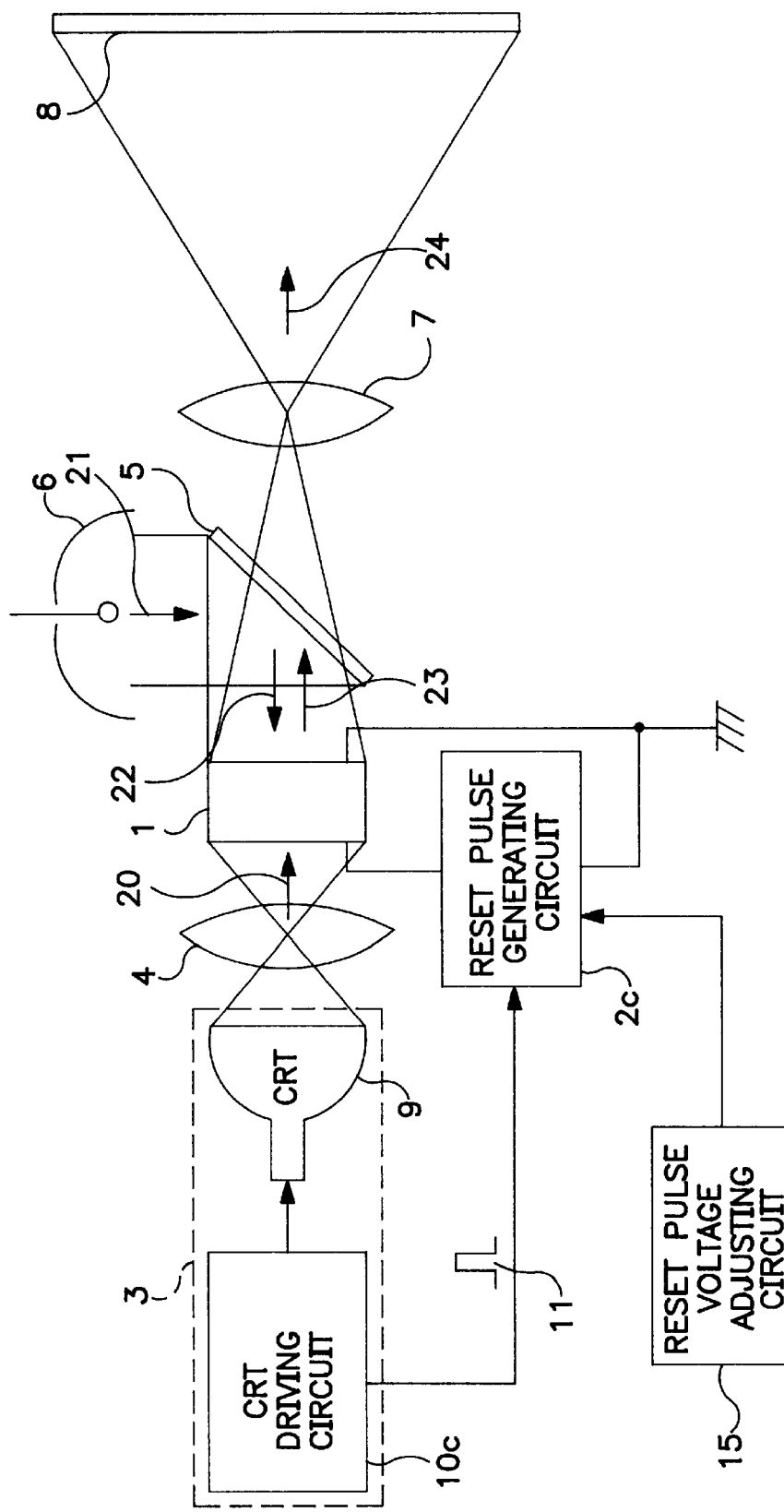
FIG. 6 is a diagram illustrating a video display device according to the third embodiment of the present invention.

FIG. 6 shows a constitution of a video display device according to a third embodiment of the present invention. Many of the constituent parts in FIG. 6 are in common with those in FIG. 1 where the constitution of the first embodiment is shown. Therefore, the following only describes those which are different from FIG. 1. In FIG. 6, numeral 2c denotes a reset pulse generating circuit, which generates a reset pulse controlled by the output from a reset pulse voltage adjusting circuit 15. The reset pulse voltage adjusting circuit 15 adjusts the writing voltage to be applied between the two electrodes of the spacial light modulator 1 during the writing period and the resetting voltage to be applied between the two electrodes of spacial light modulator 1, during the resetting period. The other constituent parts and their functions are the same as those described in the first embodiment shown in FIG. 1. and the structure and function of spacial light modulator 1 have already been described, therefore these are not repeated here.

Figure 7:
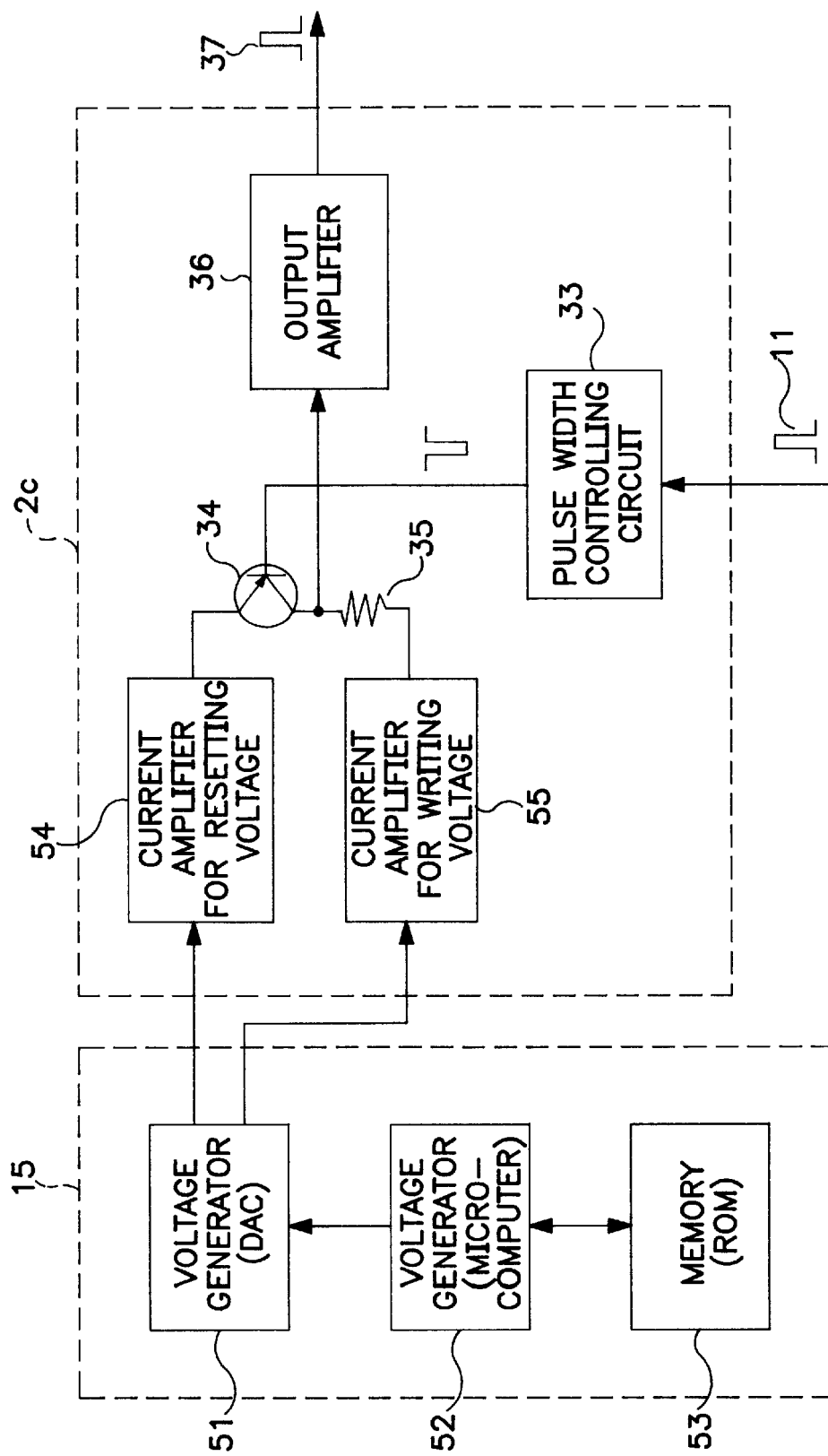
FIG. 7 shows an example of a functional diagram of a reset pulse voltage adjusting circuit and a reset pulse voltage generating circuit.

A practical example of reset pulse voltage adjusting circuit 15 is shown in FIG. 7. Numeral 51, normally comprised of a D/A converter (DAC), denotes a voltage generator for supplying the reset pulse generating circuit 2c the writing voltage to be applied between the two electrodes of the spacial light modulator 1 during the writing period and the resetting voltage to be applied between the two electrodes of the spacial light modulator 1 during resetting period. Numeral 52, normally comprised of a microcomputer, denotes a voltage controller for controlling voltage generator 51 by providing to voltage generator 51, information on voltage to be outputted. A memory 53, normally comprised of an EEP-ROM, stores values of voltages to be outputted by the voltage generator 51, or the resetting voltage value and the writing voltage value.

Numeral 2c denotes a reset pulse generating circuit. The basic function of reset pulse generating circuit remains the same as that described in the first embodiment; however, the constitution in the present embodiment differs from that of reset pulse generating circuit 2a of the first embodiment shown in FIG. 1. In the reset pulse generating circuit 2c of the present embodiment, as the resetting voltage and the writing voltage are supplied by the reset pulse voltage adjusting circuit 15, the resetting voltage generating circuit 31 and the writing voltage generating circuit 32 in FIG. 3 are replaced respectively by the current amplifier for resetting voltage 54 and the current amplifier for writing voltage 55.

In adjusting the resetting voltage and the writing voltage using the reset pulse voltage adjusting circuit 15, when an instruction to control the voltage is given from outside through e.g. a remote controller, the voltage controller 52 issues an instruction to the voltage generator 51 to change the voltage. Upon receiving an instruction to memorize information, or to turn power supply to the system OFF, the voltage controller 52 orders memory 53 to store the information on voltage being supplied to the voltage generator 51. When power supply to the system is turned ON, the voltage controller 52 reads the voltage information stored in memory 53, which information is then communicated to voltage generator 52 to control voltage generator 51.

Figure 10:
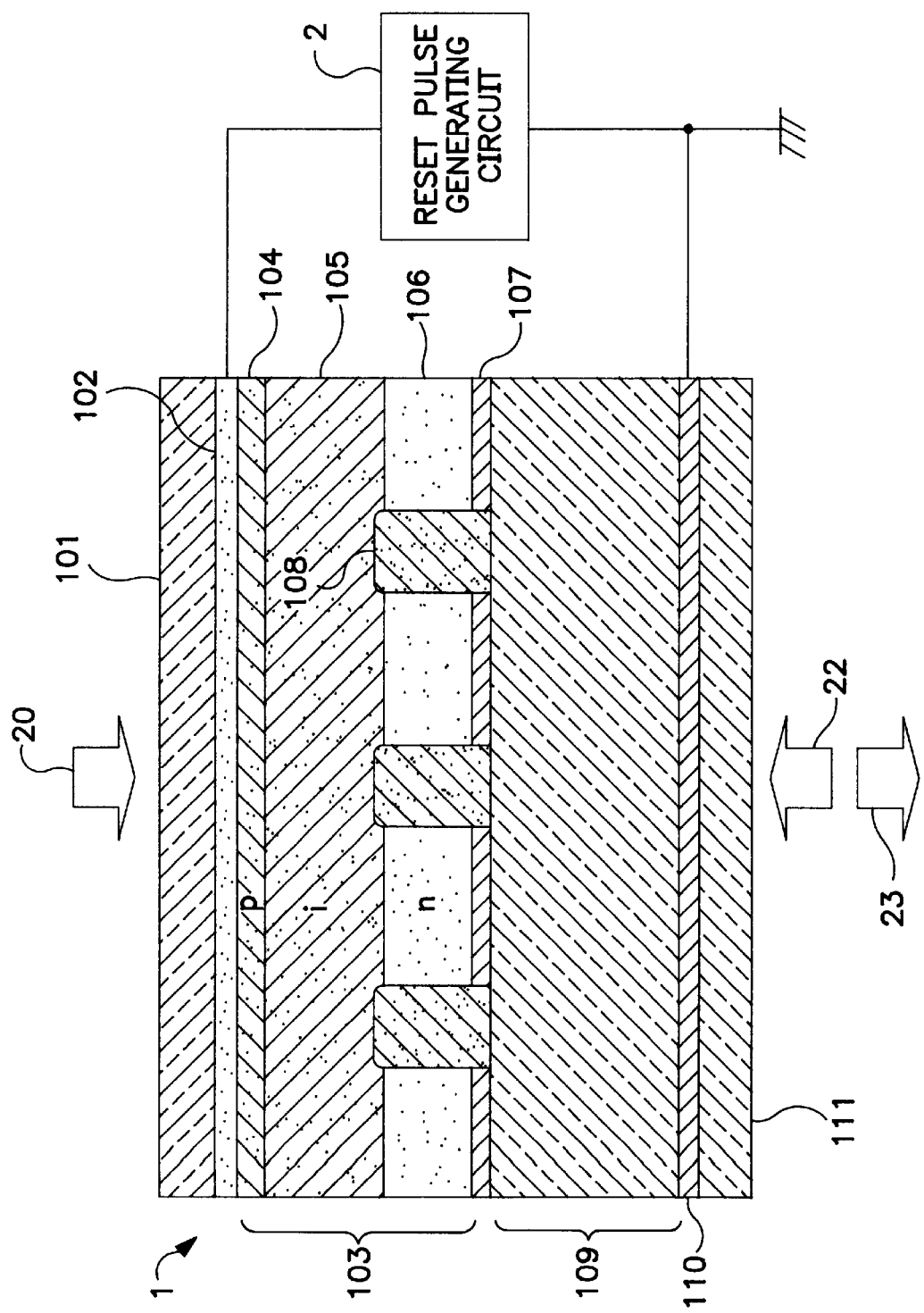
FIG. 10 shows the structure of a spacial light modulator.

The voltage waveform of a typical reset pulse outputted from the reset pulse generating circuit 2c is as shown earlier in FIG. 2(a), in which the ITO electrode 110 in readout side of spacial light modulator 1 in FIG. 10 is used as the base potential. The voltage has a rectangular waveform and is 3.5V during writing period, and is +15V during the resetting period. The time ratio between the writing period and the resetting period is 60:1.

The following describes how contrast is compensated through adjustments of the reset voltage to be applied between the two electrodes of the spacial light modulator 1 during the resetting period and the writing voltage to be applied between the two electrodes of the spacial light modulator 1 during the writing period.

Figure 8:
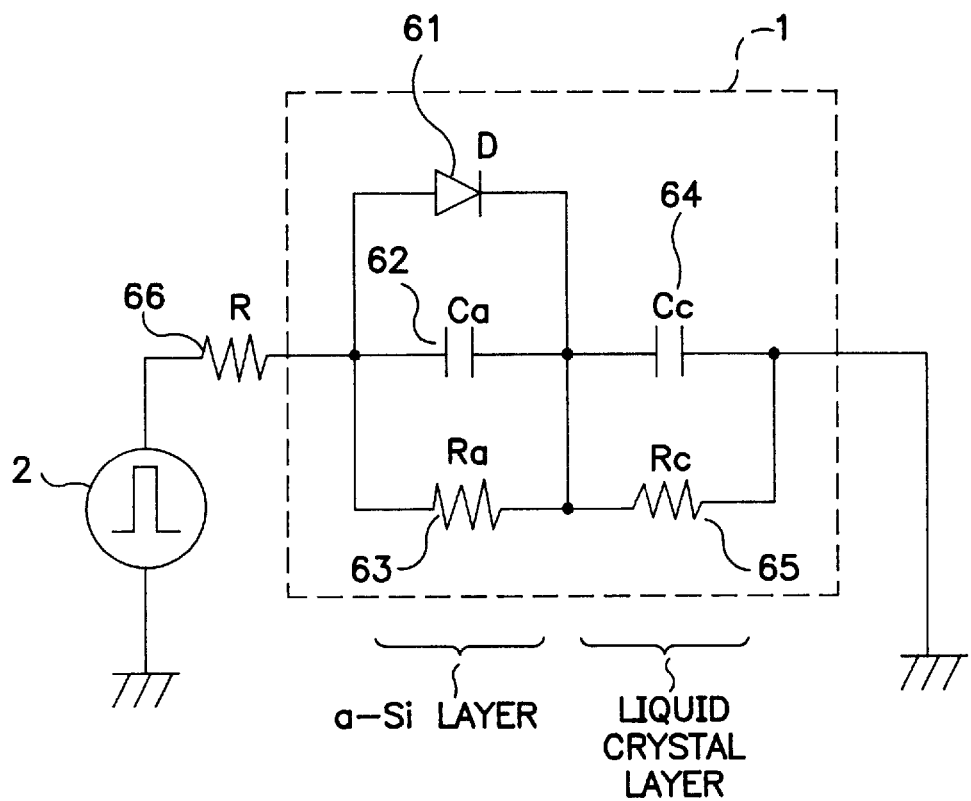
FIG. 8 shows an equivalent circuit of a spacial light modulator.

FIG. 8 is an equivalent circuit of a spacial light modulator 1, where numeral 61 denotes a diode component of an a-Si photodiode 103, 62 an equivalent capacitance (capacitor) component of an a-Si photodiode 103, 63 an equivalent resistance component of an a-Si photodiode 103, 64 an equivalent capacitance (capacitor) component of a liquid crystal layer 109, 65 an equivalent resistance component of a liquid crystal layer 109. Operation of the equivalent circuit is as described earlier: The electrons excited by the writing light during the writing period accumulate between capacitor Ca 62 and capacitor Cc 64, and are withdrawn by a forward biased diode D 61 when the reset voltage is applied during the resetting period; this cycle is repeated. The revolving angle of the liquid crystal is determined by a voltage applied between the both ends of capacitance Cc 64, and controls the intensity of light to be supplied as the output of video display system. Practically, for the white display the brightness increases along with the increasing absolute value of negative voltage applied to capacitor Cc 64, with the readout side as the basis. There is of course a saturating value in the voltage. For the black display, the darkness increases along with the increasing absolute value of positive voltage to be applied to both ends of capacitor Cc 64. Namely, the higher the absolute value of voltage to capacitor Cc 64 the greater the contrast.

The voltage on capacitor Cc 64 is influenced by equivalent resistances Ra 63, and Rc 65 within the spacial light modulator 1, and by other elements including for example the resistance values of the ITO electrodes 102, 110, the resistance value of connecting wire between spacial light modulator 1 and the reset pulse generating circuit 2c, and the resistance values of connectors. In FIG. 8, the values of resistances caused by such elements other than the equivalent resistances Ra 63, and Rc 65 within the spacial light modulator 1, are collectively represented as a resistor R 66. The existence of resistor R 66 means that the voltage to be applied to the liquid crystal layer 109 is influenced by not only the spreads in equivalent resistances Ra 63, and Rc 65 but also by resistor R 66; consequently the resetting voltage and the writing voltage to be applied to the spacial light modulator 1 have to take the voltage reduction due to resistor R 66 into consideration. Therefore, in making compensation of the contrast, the voltage to be applied to the liquid crystal layer 106 needs to be controlled considering the spreads in values of these equivalent resistances and the voltage reduction due to resistor R 66.

Figure 2:
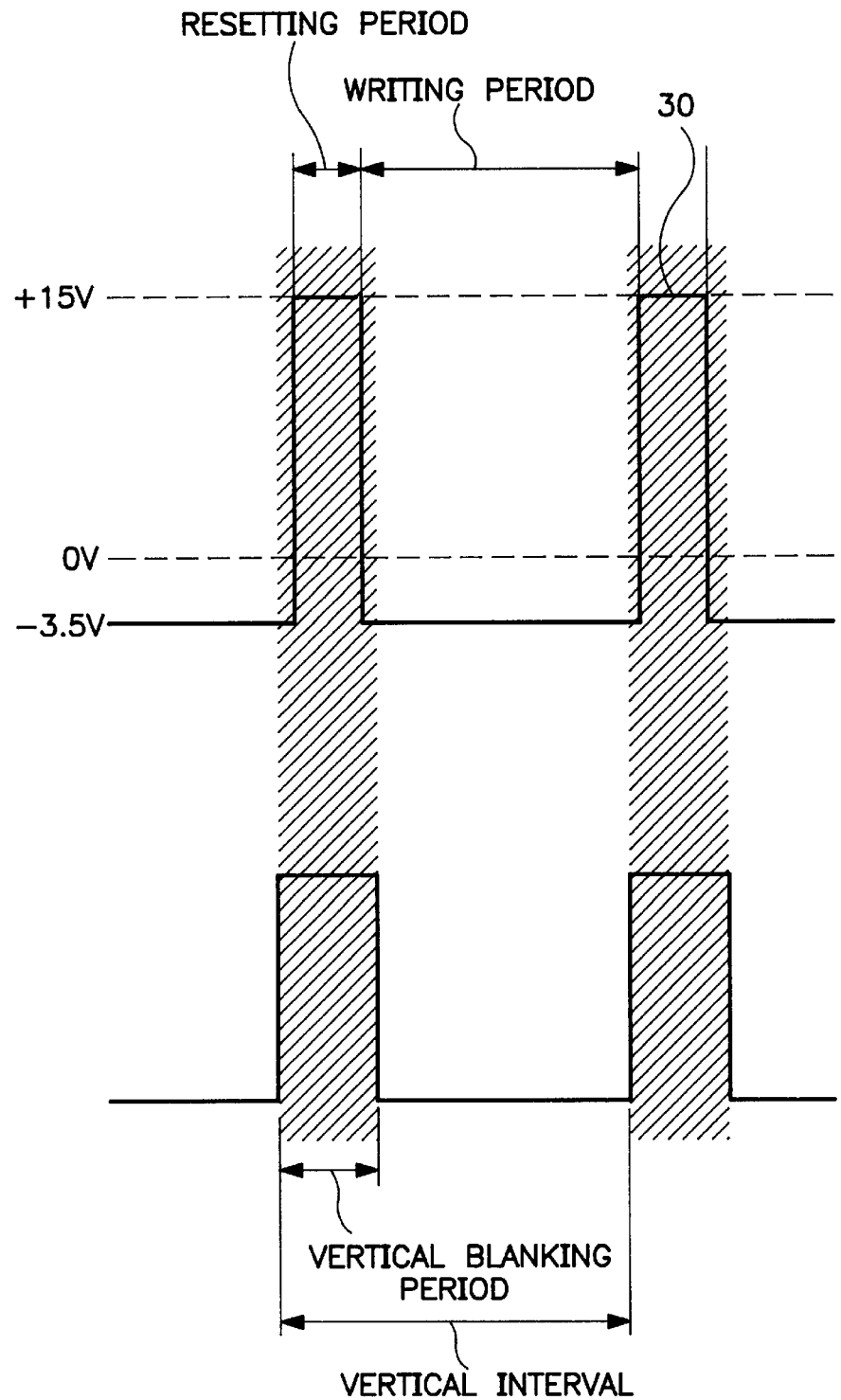

FIGS. 9A-1, 9A-2, 9A-3, 9B-1, 9B-2, 9B-3, 9C-1, 9C-2 and 9C-3 are all diagrams which are useful for explaining the principle of contrast compensation from the view point of revolution angle of liquid crystal. The description is based on an assumption that the material used in the spacial light modulator 1 is a ferroelectric liquid crystal material. FIGS. 9A-1, 9A-2 and 9A-3 illustrates a case where an appropriate voltage is applied to the liquid crystal layer 109; in FIG. 9A-1 numeral 71 represents a state of liquid crystal in black display, 72 in FIG. 9A-2 represents a state of liquid crystal in white display. When, the revolving angle of the liquid crystal reaches maximum, the γ curve takes a shape of curve 73 in(c). FIGS. 9B-1, 9B-2 and 9B-3 illustrate a situation where there is insufficient voltage applied to the liquid crystal layer 109; in black display the liquid crystal is in a position 74 of FIG. 9B-1 which is slightly revolved clockwise, while in white display the liquid crystal is revolved to a certain angle shown as 75 in FIG. 9B-2, which angle is smaller than that at a normal white display 72. The γ curve at this situation is represented as curve 76 shown in FIG. 9B-3; there is some output of reflected light even when there is no input of writing light, whereas even when the writing light is at its highest, the output is lower than γ curve 73 representing the normal situation, which means that it provides only a weak reflected light. In order to compensate the situation of diluted black as illustrated in FIG. 9B-1, the resetting voltage is increased and the liquid crystal in black display revolves counter-clockwise to 77 in FIG. 9C-1 to resume normal black display. In order to compensate for the situation of darkened white as illustrated in FIG. 9B-2, the writing voltage is decreased (larger absolute value) and the liquid crystal in white display revolves clockwise to 78 in FIG. 9C-2 to resume normal white display. This compensation results in the γ curve being restored to the normal curve 73, as illustrated as curve 79 FIG. 9C-3.

As described above, the black display and the white display may be compensated by increasing the resetting voltage against the diluted black, and decreasing the writing voltage against the darkened white. Therefore, by adjusting the resetting voltage and the writing voltage respectively, spreads in the characteristics of the spacial light modulator 1 may be compensated, providing always an appropriate contrast and γ characteristic. The adjusting of resetting voltage and that of writing voltage are not necessarily linked together.

For displaying a picture in full-color using the present system, three sets of spacial light modulator 1, writing video light generating apparatus 3, writing lens 4, beam splitter 5 and projection lens 7 are necessary, each corresponding to the three primary colors, R, G and B, respectively. In addition, a dichroic mirror is needed to split light from a light source 6 into the three primary colors, R, G and B. The functions as revealed in the present embodiment also produce the same effects in a full-color display system.

Further, in such full-color display systems, the present invention not only compensates spreads in the characteristics of the spacial light modulator but it also enables the white balancing of RGB, making it possible to produce with ease an appropriate color temperature of white. In addition, as the resetting voltage and the writing voltage each corresponding to the three RGB primary colors can be established independently, the present invention makes it possible to produce a video output of any desired color temperature by adjusting the balance of light emission among the three RGB primary colors.

What is claimed:

1. A video display device comprising:

a light writing type spacial light modulator;

a writing video light generating apparatus for generating a writing light scanning horizontally and vertically to write in said spacial light modulator; and a vertical synchronization reset pulse generating circuit for generating a resetting pulse synchronized with the vertical synchronization signal of said writing video light generating apparatus only once during one vertical blanking period for withdrawing electric charges caused by incoming of said writing light which are accumulated in said spacial light modulator, which resetting pulse is to be applied between the first and second electrodes of said spacial light modulator.

2. A video display device comprising:

a light writing type spacial light modulator;

a writing video light generating apparatus for generating a writing light scanning horizontally and vertically to write in said spacial light modulator; and a vertical synchronization reset pulse generating circuit for generating a resetting pulse synchronized with the vertical synchronization signal of said writing video light generating apparatus for withdrawing electric charges caused by incoming of said writing light which are accumulated in said spacial light modulator, which resetting pulse is to be applied between the first and second electrodes of said spacial light modulator;

a frequency/voltage converting circuit for converting the frequency of said vertical synchronization signal into a voltage according to the frequency value; and reset pulse controlling circuit for modulating the width of said resetting pulse, a resetting voltage to be applied between the two electrodes of said spacial light modulator during the resetting period, or a writing voltage to be applied between the two electrodes of said spacial light modulator during the writing period in accordance with the output of said frequency/voltage converting circuit.

3. A video display device comprising:

a light writing type spacial light modulator;

a writing video light generating apparatus for generating a writing light scanning horizontally and vertically to write in said spacial light modulator;

a reset pulse generating circuit for generating a resetting pulse for withdrawing electric charges caused by the incoming of said writing light which are accumulated in said spacial light modulator, which resetting pulse is to be applied between the first and second electrodes of said spacial light modulator; and a reset pulse voltage adjusting circuit for varying a writing voltage to be applied between the two electrodes of the spacial light modulator during the writing period and a resetting voltage to be applied between the two electrodes of the spacial light modulator during the resetting period.

4. The video display device of claim 3 wherein said reset pulse voltage adjusting circuit comprises:

a voltage generator for generating a writing voltage to be applied between the two electrodes of the spacial light modulator during the writing period and a resetting voltage to be applied between the two electrodes of the spacial light modulator during resetting period;

a voltage controller for controlling a voltage to be supplied from said voltage generator; and a memory for memorizing said voltage value.

\* \* \* \* \*

UNITED STATES PATENT AND TRADE MARK OFFICE
CERTIFICATE OF CORRECTION

PATENT NO. : 5,847,778
DATED : December 8, 1998
INVENTOR(S) : Muto et al.

It is certified that error appears in the above-identified patent and that said Letters Patent is hereby corrected as shown below:

Cover page, item [56] References Cited, U.S. Patent Documents list the following:

| | | | |
|---|---|---|---|
| 5,436,742 | 7/1995 | Tanaka et al. | 359/46 |
| 5,589,852 | 12/1996 | Thompson et al. | 345/147 |
| 5,497,172 | 3/1996 | Doherty et al. | 345/85 |
| 5,517,340 | 5/1996 | Doany et al. | 359/41 |
| 5,285,407 | 2/1994 | Gale et al. | 365/189.11 |
| 5,278,659 | 1/1994 | Araki | 358/213.19 |

Signed and Sealed this

Sixth Day of July, 1999

Attest:

*Attesting Officer*

Q. TODD DICKINSON

*Acting Commissioner of Patents and Trademarks*